Patented Jan. 5, 1954

2,665,204

UNITED STATES PATENT OFFICE 2,665,204

METHOD AND COMPOSITION FOR THE CONTROL OF UNDESIRABLE VEGETATION

Arthur W. Swezey, Garden Grove, Calif., assignor to The Dow Chemical Company, Midland, Mich., a corporation of Delaware No Drawing. Application November 23, 1951, Serial No. 257,937

12 Claims. (Cl. 71—2.6)

This invention is concerned with the suppression of the growth of undesirable vegetation and is particularly directed to a composition and method for the suppression of the growth of germinative seeds and emerging seedlings.

The concept of the chemical control of vegetation is of fairly recent origin. Beginning with the use of inorganic materials such as chlorates, arsenites, borax and salt, this concept has progressed through phytotoxic petroleum products and dinitrophenols to the aryloxy aliphatic acids and their salts and esters. The widespread acceptance and practice of such control has brought into focus shortcomings in commonly employed procedures. Thus, the herbicide chemicals currently used are sometimes as toxic to established plants as they are to germinative seeds. Also, it has generally not been possible to obtain a selective control of germinative and germinant seeds in stands of well established plant crops, that is crops past the seedling stage of growth. Further, the selective control of weeds in established plant crops is often carried out at a time when the weeds have already depleted the soil of moisture and nutrients. In addition, many of the toxicants have the property of being injurious to established plant crops when sprayed or dusted on the foliage at dosages that will kill germinant seeds.

It is an object of the present invention to provide a new method for the suppression and control of the growth of undesirable vegetation. A further object is to provide a method for the suppression of the growth of undesirable germinative and germinant seeds and emerging seedlings in soil or other growth medium which is supporting the growth of deep-rooted established plants or planted with deep-planted crops. Another object is to provide a method for the selective control of the growth of weed seeds and their emerging seedlings in soil seeded with grasses. Yet another object is to provide a method for the control of undesirable germinant seeds while decreasing the likelihood of injury to established plants. A further object is the provision of a novel composition adapted to be employed for the accomplishment of the new method of growth control. Other objects will become apparent from the following specification and claims.

According to the present invention, it has been discovered that the growth of germinant seeds and emerging seedlings may be suppressed by exposing the germinant seeds and emerging seedling rootlets to the action of a potassium xanthate of a chloroaryloxy ethanol having the formula

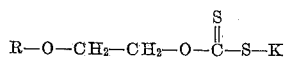

wherein R represents a chloroaryl radical. These xanthate compounds are somewhat soluble in many organic solvents and water. They appear to have a high toxicity against germinant seeds and emerging seedlings, particularly those of broadleaf weeds. Thus, they may be employed for the selective control of germinant seeds and emerging seedlings of broadleaf weeds in grass seeded areas. They are also adapted to be employed for the control of germinant seeds and emerging seedlings of grasses and broadleaf weeds in growth media supporting the growth of deep-rooted well established plants or planted with deep-planted crops. Further, they have not been found particularly injurious to established crop plants when applied to their foliage at dosages which will control the growth of germinant seeds and emerging seedlings.

The preferred embodiments of the present invention are (1) a method for the suppression of the growth of undesired vegetation which comprises the step of dispersing in a growth medium and in close proximity to the seeds and emerging seedling rootlets of such vegetation, a growth inhibiting amount of a potassium xanthate as defined in the preceding paragraph and (2) a concentrate composition for vegetative growth suppression which comprises as an active toxic ingredient the same xanthate in admixture with at least one material selected from the group consisting of finely divided inert solids and wetting and emulsifying agents.

The expression "growth media" is employed in the present specification and claims in its broadest sense to be inclusive of all conventional "soils," as defined in Webster's New International Dictionary, second edition, unabridged, published in 1937 by G. and C. Merriam Company, Springfield, Massachusetts. Thus, the term refers to any substance or medium in which vegetative organisms may take root and grow, and is intended to include not only soil but also compost, manure, humus, muck, sand and the like, adapted to support plant growth.

When operating in accordance with the present invention, growth inhibiting amounts of the xanthate toxicants are dispersed in any suitable fashion in soil or other growth medium and in close proximity to or in contact with germinative seeds or rootlets of the emerging seedlings of undesired vegetation. If desired, the unmodified toxicant may be employed, but preferably a dust or spray composition or solution of the acetate compound in a suitable organic solvent such as acetone, is mechanically mixed with the growth medium. Alternatively, the xanthate toxicants or compositions containing them may be applied to the surface of soil and thereafter dragged or disced into the soil to the desired depth. To accomplish the dispersion of the toxicant under field conditions, either the use of a liquid carrier to accomplish the penetration of the soil or other growth medium, or the discing, dragging or mixing of the treated surface is desirable. Thus, spray compositions or aqueous solutions of the xanthate compound may be applied to the surface of soil to accomplish a dispersion throughout the top ¼ to 1½ inches of soil. Also, rainfall, overhead watering or irrigation can operate to carry surface deposited toxicant down into the soil. The spray and dust compositions may be applied to soil by conventional methods, e. g., with power dusters, boom and hand sprayers and spray dusters.

In carrying out the invention, the xanthate toxicants may be compounded with any of the finely divided solids such as talc, chalk, and bentonite and other clays by grinding, mixing or by wetting the inert carrier with a solution of toxicant in volatile organic solvent, to form dust compositions. Depending upon the proportions of ingredients, these dust compositions may be employed as concentrates, and subsequently diluted with additional finely divided inert solid to obtain the desired amount of active ingredient in a dust composition adapted to be applied for the suppression of plant growth. Also, such dust concentrate compositions may be dispersed in water or other liquid carriers, with or without the aid of a dispersing agent, to form spray mixtures. The dust concentrates commonly contain from 5 to 95 percent by weight of toxic ingredient.

Further, the xanthate compounds or dust concentrate compositions containing the toxicants may be incorporated in intimate mixture with a wetting and emulsifying agent to form spray concentrates. Agents compatible in the compositions include alkaline earth metal caseinates, sodium lauryl sulfate, sulfonated aromatic hydrocarbons, alkyl aryl sulfonates, complex organic ester derivatives, sulfonated oils, aromatic aliphatic ether alcohols and the like. Such concentrates are readily dispersible in liquid carriers to form sprays containing the toxicant in any desired amount. The toxicant preferably constitutes from 5 to 95 percent by weight of the concentrate.

Similarly, the xanthate compounds may be compounded with a suitable water-immiscible organic liquid and an emulsifying agent to produce emulsifiable liquid concentrates which may be further diluted with water or water and oil to prepare spray mixtures in the form of oil in water emulsions. Preferable dispersing agents to be employed in these compositions are oil soluble and include the non-ionic emulsifiers such as the condensation products of alkylene oxide with phenols and organic acids, polyoxyethylene derivatives of sorbitan esters, complex ether alcohols and the like. However, oil soluble ionic emulsifying agents such as mahogany soaps may also be used. Suitable organic liquids to be employed in the compositions include petroleum oils and distillates, liquid halo hydrocarbons and synthetic organic oils. The toxicant in such concentrates preferably constitutes from about 5 to 95 percent by weight of the composition.

The introduction of the toxicant, or spray or dust compositions containing the toxicant into growth media gives rise to varying degrees of response in germinant seeds, emerging seedlings and growing plants depending upon the nature of the seed or plant and the dosage dispersed in the growth media, as well as the weather conditions of temperature and moisture. When large dosages are dispersed in growth media, a temporary inhibition of the growth of seeds and plants is obtained. This aproaches a sterilizing action. The weathering action of sun and rain, and possibly the disassociation of the xanthate compounds by the action of bacteria and other soil organisms eventually frees the growth medium of the toxicant. In relatively dilute dosages the xanthate materials suppress the growth of the germinant seeds and emerging seedlings of broadleaf weeds while permitting the growth of the seeds and emerging seedlings of many grasses. Thus, it is possible to effect a selective treatment of mixed seedings of broadleaf weeds and grasses. Even when the emerging weed seedlings are not killed, but only retarded in growth, the grass is able to choke out the weeds by reason of its more vigorous growth.

Further, the toxicant may be employed to produce a selective control of the germinant seeds and emerging seedlings of weeds and grasses in soil (1) containing deep-rooted established plants such as corn, potatoes, raspberries, and asparagus, or (2) planted with deep-planted crops such as corn, potatoes, beans, sugar cane and tubers and corns of ornamental plants. In such operation, the xanthate compounds are applied to the soil in amounts sufficient to effect a dispersion of the toxicant through the upper ¼ to 1½ inches of soil. Here the toxicants are available and effect a control of germinant seeds and emerging seedlings of weeds and grasses while permitting the growth of deep-rooted established plants or deep-planted crops. Under normal conditions of moisture, aeration, and bacterial action, the herbicidal effect of the toxicant is dissipated within a few weeks.

The exact concentration of the xanthate toxicant employed in compositions for treatment of growth media is not critical, provided that a minimum effective dosage is employed. This dosage of toxicant is dependent upon the susceptibility of the plants to be controlled. In selective operations, this dosage is dependent upon the tolerance of the crop, and the position of the developing crop roots. In non-selective applications to growth media, good results are obtained when a dosage of toxicant is supplied in the amount of from about 3 to 104 parts per million parts by weight of the medium. In applications to soil, good results are obtained when the xanthate toxicant is distributed at the rate of from 0.5 to 100 pounds per acre. In such applications, it is desirable that the compound be distributed to a depth of at least 0.25 inch and preferably at a dosage of at least 1.0 pound per acre inch. In selective applications, for the control of emerging seedlings and germinant seeds of broadleaf weeds in grass seeded areas, a dosage of from 0.5 to 4 pounds per acre distributed in soil to a depth of from ¼ to 3 inches, is desirable. In selective applications for the control of emerging seedlings and germinant seeds of broadleaf weeds and grasses in deep-rooted established plants and deep-planted crops a dosage of from 0.5 to 16 pounds per acre distributed to a depth of from ¼ to 1½ inches is desired. These amounts of toxicant may be supplied per acre in from 50 to 200 gallons or more of water or other liquid carrier, or in from 50 to 300 pounds of solid carrier.

The concentration of toxicant in spray compositions employed to supply the desired dosage is from 0.1 to 50 percent by weight or higher in water or other inert liquid carrier. In dusts, the concentration of the toxicant may be from 1 to 95 percent by weight.

The following examples illustrate the invention but are not to be construed as limiting the same:

Example 1

Potassium 2-(2,4-dichlorophenoxy)ethylxanthate was dissolved in water to prepare aqueous spray compositions containing various amounts of toxicant per 100 gallons of spray mixture. These spray mixtures were applied to moist sandy loam soil of good nutrient content at a dosage of 100 gallons per acre. The applications were made with conventional spray rig at a pressure of 10 pounds per square inch. 24 hours prior to the treatments, the soil had been prepared and seeded with the seeds of various grasses and weeds. In the seedings, lettuce, bur clover, mustard and redweed were representative of broadleaf weeds. Canary grass and rye were representative of grasses. Each treatment was replicated five times. The seed plots were subjected to overhead watering in an amount corresponding to about 4 inches of rainfall per month. Twenty-four days after the treatments, the plots were examined to ascertain the control of germinant seeds and emerging seedlings that had been obtained, and the following situation expressed in percent control, was found to exist:

| Pounds of toxicant per acre | Percent Control | | | | |
|---|---|---|---|---|---|
| | Lettuce | Bur Clover | Mustard | Redweed | Rye and Canary Grass |
| 1 | 100 | 85 | 98 | 50 | 0 |
| 5 | 98 | 90 | 100 | 70 | 25 |
| 25 | 100 | 100 | 100 | 90 | 90 |

Check areas sowed with the recited species of weed and grasses grew to a dense tangle of vegetation.

Example 2

Aqueous spray mixtures containing various amounts of potassium 2-(2,4-dichlorophenoxy)-ethylxanthate were employed as described in Example 1 for the control of the growth of germinant seeds and emerging seedlings of various plants and grasses. In those operations, each treatment was replicated twice. Nine days following the treatments, the plots were examined and the following situation was found to exist:

| Pounds of toxicant per acre | Percent Control | | | | | |
|---|---|---|---|---|---|---|
| | White Clover | Radish | Amaranthus | Lamb's Quarters | Canary Grass | Water Grass |
| 6.0 | 95 | 98 | 95 | 95 | 65 | 60 |
| 9.0 | 95 | 100 | 95 | 95 | 70 | 60 |
| 12.0 | 98 | 100 | 98 | 98 | 75 | 75 |

Check areas sowed with the above enumerated plants and grasses supported a luxuriant growth of the test plant species.

Example 3

Different xanthate toxicants were separately dissolved in water to prepare aqueous spray compositions containing various amounts of toxicant per 100 gallons of spray mixture. These spray mixtures were applied to plots of soil of good nutrient content at a dosage of 100 gallons per acre. The applications were made with conventional spraying equipment at a pressure of 10 pounds per square inch. Forty-eight hours prior to the treatment the soil plots were seeded with germinative seeds of lamb's quarters, radish, pigweed and canary grass. The seed plots were subjected to overhead watering in an amount corresponding to 3 inches of rainfall per month. Each treatment was replicated twice. Ten days after the treatments, the plots were examined to ascertain the control of germinant seeds and emerging seedlings that had been obtained and the following situation expressed in percent control was found to exist:

| Toxicant | Pounds of Toxicant Per Acre | Percent Control | | |
|---|---|---|---|---|
| | | Canary Grass | Radish | Lamb's Quarters and Pigweed |
| Potassium 2-(2,4-dichlorophenoxy)-ethylxanthate | 4.8 | 15 | 97 | 85 |
| Potassium 2-(2,4,5-trichlorophenoxy)-ethylxanthate | 5.8 | 37 | 97 | 95 |
| Potassium 2-(4-chloro-o-toloxy)-ethylxanthate | 4.8 | 0 | 100 | 97 |
| Potassium 2-(4-chlorophenoxy)ethylxanthate | 3.6 | 15 | 65 | 90 |

Substantially complete germination of all seeds was found in check areas planted with the test plant species.

Example 4

Aqueous spray compositions prepared as described in Example 3 were employed for the control of the newly emerged seedlings of radish, lamb's quarters, pigweed and canary grass. In such operations, the spray compositions were applied to plots of the newly emerged seedlings of the recited test species. The application techniques, dosages employed and watering requirements were all as previously described. Each such treatment was replicated twice. Ten days following the treatment, the plots were examined to ascertain the control of newly emerged seedlings that had been obtained. The results are summarized in the following table:

| Toxicant | Pounds of Toxicant Per Acre | Percent control of newly emerged seedlings | | |
|---|---|---|---|---|
| | | Canary Grass | Radish | Lamb's Quarters and Pigweed |
| Potassium 2-(2,4-dichlorophenoxy)ethylxanthate | 4.8 | 0 | 97 | 95 |
| Potassium 2-(2,4,5-trichlorophenoxy)-ethylxanthate | 5.8 | 0 | 97 | 60 |
| Potassium 2-(4-chloro-o-toloxy)-ethylxanthate | 4.8 | 0 | 92 | 95 |
| Potassium 2-(4-chlorophenoxy)-ethylxanthate | 3.6 | 0 | 60 | 90 |

Check areas containing the recited test plant species grew to a dense tangle of vegetation.

Example 5

An aqueous solution of potassium 2-(2,4-dichlorophenoxy)ethylxanthate containing 4 pounds of toxicant per 100 gallons was applied to the foliage of a well established, mixed stand of mustard, vinegar weed, Amaranthus species (pigweed) and red stem filaree. The latter weeds were growing on Hanford sandy loam soil which was covered with about three inches of dry mulch. The treatment was carried out with conventional spraying equipment and at a dosage of 50 gallons per acre. Observations were carried out to determine the presence of any twisting or nastic response in the treated plants, and no such response attributable to the xanthate compound, was found.

Example 6

50 parts by weight of potassium 2-(2,4-dichlorophenoxy)ethylxanthate, 47 parts of attapulgite, 2 parts of a partially desulfonated sodium lignosulfonate (Marasperce CB) and 1 part of sodium lauryl sulfate (Grasselle IN 181 P) were mechanically mixed and ground together to prepare concentrate composition in the form of a wettable powder. In a similar manner, 50 parts by weight of potassium 2-(2,4-dichlorophenoxy)ethylxanthate, 47 parts of attapulgite, 2 parts of Marasperce CB and 1 part of an alkyl aryl sulfonate (Nacconal NR) were mixed together to obtain a wettable powder concentrate composition. These compositions are adapted to be dispersed in water to prepare aqueous spray compositions which have very desirable wetting and penetrating properties.

Example 7

An aqueous spray composition containing 3 pounds of potassium 2-(4-chloro-o-toloxy)ethylxanthate per 200 gallons of spray mixture is employed for the control of undesirable vegetation in an asparagus field during the harvesting season. In such operations, the spray mixture is applied to the soil surface at a dosage of 200 gallons per acre and just prior to the emergence of weeds, grasses and asparagus spears. At spaced intervals of approximately three weeks, two additional applications are made to extend the vegetation control through the asparagus spear cutting season. The applications are made with conventional spraying equipment at a pressure of 20 pounds per square inch. Throughout the harvest season, the asparagus field reains substantially free of undesirable weeds and grasses. Following the harvest, the yields of cut spears from the treated field is found to be 9 percent greater than the yields found in adjacent check fields.

The potassium 2-(chloroaryloxy)ethylxanthates employed in accordance with the teachings of the present invention are crystalline solids. These compounds may be prepared by reacting together (1) potassium hydroxide, (2) carbon bisulfide and (3) a chloroaryloxyethanol such as 4-chlorophenoxyethanol, 4-chloro-o-toloxyethanol, 2,4-dichlorophenoxyethanol and 2,4,5-trichlorophenoxyethanol. The reaction is conveniently carried out in an inert organic solvent in which the desired xanthate product is insoluble and preferable in a low boiling solvent such as ether or normal pentane. Good results are obtained when substantially equimolecular proportions of the reactants are employed. In carrying out the reaction, the chloroaryloxyalkanol and carbon bisulfide may be dispersed in the reaction solvent and the potassium hydroxide added portionwise thereto with stirring. The reaction is somewhat exothermic and takes place smoothly at the temperature range of from about 20° to 40° C. Following the reaction, the reaction product may be separated by conventional methods, e. g., filtration or decantation. These xanthate compounds are claimed per se and a method for their preparation disclosed in the application of Bryant C. Fischback, Serial No. 234,449, filed June 29, 1951.

I claim:

1. A method for the suppression of the growth of undesirable vegetation which comprises the step of exposing the seeds and emerging seedling rootlets of such vegetation to the action of a growth inhibiting amount of a potassium xanthate of a chloroaryloxyethanol having the formula

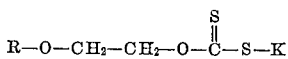

wherein R represents a chloroaryl radical.

2. A method for the suppression of the growth of undesirable vegetation which comprises the step of dispersing in a growth medium and in close proximity to the seeds and emerging seedling rootlets of such vegetation, a growth inhibiting amount of a xanthate compound having the formula

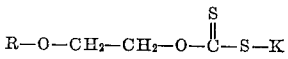

wherein R represents a chloroaryl radical.

3. A method for the suppression of the growth of germinant seeds and emerging seedlings which comprises the step of contacting the seeds and emerging seedling rootlets, while positioned in a growth medium, with a growth inhibiting amount of a xanthate compound having the formula

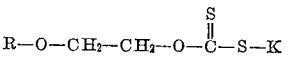

wherein R represents a chloroaryl radical.

4. A method as claimed in claim 2, wherein the xanthate compound is present in the amount of at least 3 parts by weight per million parts of growth medium.

5. A method for the selective control of the germinant seeds and emerging seedlings of broadleaf weeds and grasses in soil supporting the growth of deep-rooted, established plants, which comprises the step of distributing in such soil to a depth of from 0.25 to 1.5 inches, a dosage of from 0.5 to 16 pounds per acre of a compound having the formula

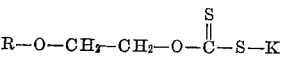

wherein R represents a chloroaryl radical.

6. A method for the suppression of the growth of emerging seedlings and germinant seeds in soil which comprises the step of distributing therein at the rate of at least 0.5 pound per acre a xanthate compound having the formula

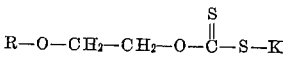

wherein R represents a chloroaryl radical.

7. A method as claimed in claim 6, wherein the xanthate compound is distributed to a depth of at least 0.25 inch.

8. A method as claimed in claim 6, wherein the xanthate compound is potassium 2-(2,4-dichlorophenoxy)ethylxanthate.

9. A method as claimed in claim 6, wherein the xanthate compound is potassium 2-(2,4,5-trichlorophenoxy)-ethylxanthate.

10. A method as claimed in claim 6, wherein the xanthate compound is potassium 2-(4-chloro-o-toloxy)-ethylxanthate.

11. A concentrate composition for the suppression of vegetative growth which comprises as an active toxic ingredient a xanthate compound having the formula $$R-O-CH_2-CH_2-O-\overset{S}{\underset{\|}{C}}-S-K$$

wherein R represents a chloroaryl radical, in admixture with at least one material selected from the group consisting of finely divided inert solids and wetting and emulsifying agents.

12. A concentrate composition for the suppression of vegetative growth which comprises as an active toxic ingredient a xanthate compound having the formula $$R-O-CH_2-CH_2-O-\overset{S}{\underset{\|}{C}}-S-K$$

wherein R represents a chloroaryl radical, in admixture with a finely divided inert solid.

ARTHUR W. SWEZEY.

References Cited in the file of this patent

UNITED STATES PATENTS

| Number | Name | Date |
|---|---|---|
| 2,573,769 | Lambrech | Nov. 6, 1951 |